US008639716B2

(12) United States Patent
Volkert

(10) Patent No.: US 8,639,716 B2
(45) Date of Patent: *Jan. 28, 2014

(54) SEARCH ASSISTANT FOR DIGITAL MEDIA ASSETS

(71) Applicant: Apple Inc., Cupertino, CA (US)

(72) Inventor: Christopher Volkert, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,267

(22) Filed: Jan. 11, 2013

(65) Prior Publication Data

US 2013/0191408 A1    Jul. 25, 2013

Related U.S. Application Data

(63) Continuation of application No. 11/925,599, filed on Oct. 26, 2007, now Pat. No. 8,364,694.

(51) Int. Cl.
*G06F 17/30* (2006.01)

(52) U.S. Cl.
USPC .......................................... 707/767; 705/26.1

(58) Field of Classification Search
USPC .......................................... 707/767; 705/26.1
See application file for complete search history.

(56) References Cited

U.S. PATENT DOCUMENTS

| 4,974,191 A | 11/1990 | Amirghodsi et al. |
| 5,128,672 A | 7/1992 | Kaehler |
| 5,282,265 A | 1/1994 | Rohra Suda et al. |
| 5,386,556 A | 1/1995 | Hedin et al. |
| 5,434,777 A | 7/1995 | Luciw |
| 5,479,488 A | 12/1995 | Lenning et al. |
| 5,577,241 A | 11/1996 | Spencer |
| 5,608,624 A | 3/1997 | Luciw |
| 5,682,539 A | 10/1997 | Conrad et al. |
| 5,727,950 A | 3/1998 | Cook et al. |
| 5,748,974 A | 5/1998 | Johnson |

(Continued)

FOREIGN PATENT DOCUMENTS

| EP | 1245023 | 10/2002 |
| JP | 06 019965 | 1/1994 |

(Continued)

OTHER PUBLICATIONS

Google, Google Suggest: Frequently Asked Questions (Jun. 13, 2006) accessed Jan. 26, 2010 at http://web.archive.org/web/20060613122748/http://labs.google.com/suggestf-aq.html.

(Continued)

*Primary Examiner* — William Spieler
(74) *Attorney, Agent, or Firm* — Kilpatrick Townsend & Stockton LLP

(57) ABSTRACT

Techniques and systems for facilitating searching of digital media assets are disclosed. In one embodiment, a user can be assisted in entering search strings for searching a media repository (e.g., online media store) having a plurality of digital media assets that are available, e.g., available for purchase. When the user enters a search character, a list of possible complete search strings corresponding to digital media assets available in the media repository can be obtained over a network and presented to the user. The list of possible search strings can be filtered based on whether a client device supports a media type associated with a word or based on a location of the client device.

20 Claims, 10 Drawing Sheets

(56) References Cited

U.S. PATENT DOCUMENTS

| | | |
|---|---|---|
| 5,794,050 A | 8/1998 | Dahlgren et al. |
| 5,826,261 A | 10/1998 | Spencer |
| 5,895,466 A | 4/1999 | Goldberg et al. |
| 5,899,972 A | 5/1999 | Miyazawa et al. |
| 5,915,249 A | 6/1999 | Spencer |
| 5,987,404 A | 11/1999 | Della Pietra et al. |
| 6,052,656 A | 4/2000 | Suda et al. |
| 6,081,750 A | 6/2000 | Hoffberg et al. |
| 6,088,731 A | 7/2000 | Kiraly et al. |
| 6,144,938 A | 11/2000 | Surace et al. |
| 6,188,999 B1 | 2/2001 | Moody |
| 6,233,559 B1 | 5/2001 | Balakrishnan |
| 6,334,103 B1 | 12/2001 | Surace et al. |
| 6,421,672 B1 | 7/2002 | McAllister et al. |
| 6,434,524 B1 | 8/2002 | Weber |
| 6,446,076 B1 | 9/2002 | Burkey et al. |
| 6,453,292 B2 | 9/2002 | Ramaswamy et al. |
| 6,499,013 B1 | 12/2002 | Weber |
| 6,501,937 B1 | 12/2002 | Ho et al. |
| 6,513,063 B1 | 1/2003 | Julia et al. |
| 6,523,061 B1 | 2/2003 | Halverson et al. |
| 6,526,395 B1 | 2/2003 | Morris |
| 6,532,444 B1 | 3/2003 | Weber |
| 6,564,213 B1 | 5/2003 | Ortega et al. |
| 6,598,039 B1 | 7/2003 | Livowsky |
| 6,601,026 B2 | 7/2003 | Appelt et al. |
| 6,615,172 B1 | 9/2003 | Bennett et al. |
| 6,633,846 B1 | 10/2003 | Bennett et al. |
| 6,650,735 B2 | 11/2003 | Burton et al. |
| 6,665,640 B1 | 12/2003 | Bennett et al. |
| 6,691,111 B2 | 2/2004 | Lazaridis et al. |
| 6,691,151 B1 | 2/2004 | Cheyer et al. |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,778,951 B1 | 8/2004 | Contractor |
| 6,792,082 B1 | 9/2004 | Levine |
| 6,807,574 B1 | 10/2004 | Partovi et al. |
| 6,842,767 B1 | 1/2005 | Partovi et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,928,614 B1 | 8/2005 | Everhart |
| 6,937,975 B1 | 8/2005 | Elworthy |
| 6,964,023 B2 | 11/2005 | Maes et al. |
| 6,980,949 B2 | 12/2005 | Ford |
| 6,996,531 B2 | 2/2006 | Korall et al. |
| 7,027,974 B1 | 4/2006 | Busch et al. |
| 7,036,128 B1 | 4/2006 | Julia et al. |
| 7,050,977 B1 | 5/2006 | Bennett |
| 7,062,428 B2 | 6/2006 | Hogenhout et al. |
| 7,069,560 B1 | 6/2006 | Cheyer et al. |
| 7,092,928 B1 | 8/2006 | Elad et al. |
| 7,127,046 B1 | 10/2006 | Smith et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,177,798 B2 | 2/2007 | Hsu et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,904 B2 | 6/2007 | Luisi |
| 7,277,854 B2 | 10/2007 | Bennett et al. |
| 7,290,039 B1 | 10/2007 | Lisitsa et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,426,467 B2 | 9/2008 | Nashida et al. |
| 7,447,635 B1 | 11/2008 | Konopka et al. |
| 7,454,351 B2 | 11/2008 | Jeschke et al. |
| 7,475,010 B2 | 1/2009 | Chao |
| 7,483,894 B2 | 1/2009 | Cao |
| 7,502,738 B2 | 3/2009 | Kennewick et al. |
| 7,526,466 B2 | 4/2009 | Au |
| 7,539,656 B2 | 5/2009 | Fratkina et al. |
| 7,546,382 B2 | 6/2009 | Healey et al. |
| 7,548,895 B2 | 6/2009 | Pulsipher |
| 7,555,431 B2 | 6/2009 | Bennett |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,267 B2 | 4/2010 | Lisitsa et al. |
| 7,711,672 B2 | 5/2010 | Au |
| 7,716,056 B2 | 5/2010 | Weng et al. |
| 7,720,674 B2 | 5/2010 | Kaiser et al. |
| 7,725,307 B2 | 5/2010 | Bennett |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,752,152 B2 | 7/2010 | Paek et al. |
| 7,783,486 B2 | 8/2010 | Rosser et al. |
| 7,809,570 B2 | 10/2010 | Kennewick et al. |
| 7,818,176 B2 | 10/2010 | Freeman et al. |
| 7,822,608 B2 | 10/2010 | Cross, Jr. et al. |
| 7,831,426 B2 | 11/2010 | Bennett |
| 7,840,400 B2 | 11/2010 | Lavi et al. |
| 7,873,519 B2 | 1/2011 | Bennett |
| 7,873,654 B2 | 1/2011 | Bernard |
| 7,881,936 B2 | 2/2011 | Longe et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,930,168 B2 | 4/2011 | Weng et al. |
| 7,949,529 B2 | 5/2011 | Weider et al. |
| 7,974,844 B2 | 7/2011 | Sumita |
| 7,983,917 B2 | 7/2011 | Kennewick et al. |
| 7,983,997 B2 | 7/2011 | Allen et al. |
| 7,987,151 B2 | 7/2011 | Schott et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,041,570 B2 | 10/2011 | Mirkovic et al. |
| 8,055,708 B2 | 11/2011 | Chitsaz et al. |
| 8,069,046 B2 | 11/2011 | Kennewick et al. |
| 8,073,681 B2 | 12/2011 | Baldwin et al. |
| 8,082,153 B2 | 12/2011 | Coffman et al. |
| 8,095,364 B2 | 1/2012 | Longe et al. |
| 8,107,401 B2 | 1/2012 | John et al. |
| 8,112,275 B2 | 2/2012 | Kennewick et al. |
| 8,165,886 B1 | 4/2012 | Gagnon et al. |
| 2002/0133417 A1 | 9/2002 | Hanks et al. |
| 2004/0093299 A1 | 5/2004 | Bodin et al. |
| 2005/0071332 A1 | 3/2005 | Ortega et al. |
| 2005/0080625 A1 | 4/2005 | Bennett et al. |
| 2005/0119897 A1 | 6/2005 | Bennett et al. |
| 2006/0083119 A1 | 4/2006 | Hayes |
| 2006/0101009 A1 | 5/2006 | Weber et al. |

(56) References Cited

U.S. PATENT DOCUMENTS

| | | |
|---|---|---|
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0061335 A1 | 3/2007 | Ramer et al. |
| 2007/0088556 A1 | 4/2007 | Andrew |
| 2007/0100790 A1 | 5/2007 | Cheyer et al. |
| 2007/0185917 A1 | 8/2007 | Prahlad et al. |
| 2007/0244867 A1 | 10/2007 | Malandain et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0120276 A1 | 5/2008 | Chennavasin |
| 2008/0140657 A1 | 6/2008 | Azvine et al. |
| 2008/0214155 A1 | 9/2008 | Ramer et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0300878 A1 | 12/2008 | Bennett |
| 2009/0006343 A1 | 1/2009 | Platt et al. |
| 2009/0030800 A1 | 1/2009 | Grois |
| 2009/0058823 A1 | 3/2009 | Kocienda |
| 2009/0076796 A1 | 3/2009 | Daraselia |
| 2009/0100049 A1 | 4/2009 | Cao |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0299745 A1 | 12/2009 | Kennewick et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0131036 A1 | 6/2011 | Di Cristo et al. |
| 2011/0131045 A1 | 6/2011 | Cristo et al. |
| 2011/0144999 A1 | 6/2011 | Jang et al. |
| 2011/0161076 A1 | 6/2011 | Davis et al. |
| 2011/0175810 A1 | 7/2011 | Markovic et al. |
| 2011/0184730 A1 | 7/2011 | LeBeau et al. |
| 2011/0231182 A1 | 9/2011 | Weider et al. |
| 2011/0231188 A1 | 9/2011 | Kennewick et al. |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |

FOREIGN PATENT DOCUMENTS

| | | |
|---|---|---|
| JP | 2001 125896 | 5/2001 |
| JP | 2002 024212 | 1/2002 |
| JP | 2003 517158 | 5/2003 |
| JP | 2009 036999 | 2/2009 |
| KR | 10-0776800 | 11/2007 |
| KR | 10-0810500 | 3/2008 |
| KR | 10 2008 109322 | 12/2008 |
| KR | 10 2009 086805 | 8/2009 |
| KR | 10-0920267 | 10/2009 |
| KR | 10 2011 0113414 | 10/2011 |
| WO | WO 2011/088053 | 7/2011 |

OTHER PUBLICATIONS

Wikipedia, iTunes Store (Oct. 25, 2006) accessed Jan. 26, 2010 at http://web.archive.org/web/20060613122748/http://labs.google.com/suggestf-aq.html.

Stiles, Hacking Google Suggest (Dec. 10, 2004) accessed Jan. 22, 2010 at http://adamstiles.com/2004/12/hacking.sub.--google.sub.--/.

Maloney, Google: Tiananmen? Never Happened! (Jan. 28, 2006) accessed Jan. 22, 2010 at http://brain-terminal.com/posts/2006/01/28/google-tiananmen-never-happene- d.

Blogoscoped, Google Censorship Faq (Mar. 2, 2007) accessed Jan. 22, 2010 at http://blogoscoped.com/archive/2007-03-02-n19.html.

Wikipedia, iTunes Store, Oct. 25, 2006.

Wikipedia, DVD region core, Oct. 25, 2006.

Snook, iTunes Search API Around the Corner, Sep. 14, 2006.

Flippo, Downloading German Songs from iTunes, Sep. 19, 2005 (retrieved at http://web.archive.org/web/20050919035659/http://german.about.com/od/musi-c/a/itunes.htm).

"Google Suggest: Frequently Asked Questions", http://labs.google.com/suggestfaq.html, pp. 1-3, downloaded Oct. 5, 2007.

Bratt, Carol, "Understanding AutoCorrect, AutoText and AutoComplete: MS Word", http://www.infopackets.com/channels/en/windows/carols.sub.--c...cn- ding.sub.--autocorrect.sub.--auto.sub.--text.sub.--and.sub.--autocomplete.- sub.--ms.sub.--word.htm, pp. 1-4, downloaded Oct. 5, 2007.

"Trie", http://en.wikipedia.org/wiki/Trie, pp. 1-4, downloaded Oct. 4, 2007.

Alfred App, 2011, http://www.alfredapp.com/, 5 pages.

Ambite, JL., et al., "Design and Implementation of the CALO Query Manager," Copyright @ 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, http://www.isi.edu/people/ambite/publications/integration.sub.--he- terogeneous.sub.--knowl-edge.sub.--sources.sub.--calo.sub.--query.sub.--man- ager, 18 pages.

Belvin, R. et al., "Development of the HRL Route Navigation Dialogue System," 2001, In Proceedings of the First International Conference on Human Language Technology Research, Paper, Copyright .COPYRGT. 2001 HRL Laboratories, LLC, http://citeseerx.ist.psu.edu/viewdoc/surnmary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-t- oe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," .COPYRGT. Springer-Verlag London Ltd, Virtual Reality 1999, 3:1-15, 15 pages.

(56) References Cited

OTHER PUBLICATIONS

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://d1.acm.org/citation.cfm?id=165320, 14 pages.

Elio, R. et al., "On Abstract Task Models and Conversation Policies," http://webdocs.cs.ualberta.ca/.about.ree/publications/papers2/ATS.AA99.pd-f, May 1999, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications.sub.--publi- c/deliverables.sub.--public/D1.sub.--6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-r- ecommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright .COPYRGT. 2005, http://www.ai.sri.com/about.gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf-, 5 pages.

Glass, J., et al., "Multilingual Spoken-Language Understanding in the MIT Voyager System," Aug. 1995, http://groups.csail.mit.edu/sls/publications/1995/speechcomm95-voyager.pd- f, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) The Travesty of the Commons," Presentation at NPUC 2006, New Paradigms for User Computing, IBM Almaden Research Center, Jul. 24, 2006. http://toringruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the.Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://torngruber.org/writing/organizational-intelli-gence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium.sub.--presentations/gruber.sub.--- cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc,/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-so-cial-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," in Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," in International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

(56) References Cited

OTHER PUBLICATIONS

Guzzoni, D., et al., "Active, A Platform for Building Intelligent Operating Rooms," Surgetica 2007 Computer-Aided Medical Interventions: tools and applications, pp. 191-198, Paris, 2007, Sauramps Medical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-fo- r-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un editeur interactif de tableaux dessines amain levee (an Interactive Editor for Hand-Sketched Tables), Traitement du Signal 1995, vol. 12, No. 6, 8 pages, No English Translation Available.
Karp, P. D., "A Generic Knowledge-Base Access Protocol," May 12, 1994, http://lecture.cs.buu.ac.th/.about.f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative.Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration, Talk and Look: Tools for Ambient Linguistic Knowledge," Aug. 8, 2006, http://www.ihmc.us/users/nblaylock/Pubs/Files/talk.sub.--d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Muhlhauser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer.sub.--friendly.sub.--article.aspx-?id=22117, 2 pages.
Neches, R., "Enabling Technology for Knowledge Sharing," Fall 1991, AI Magazine, pp. 37-56, (21 pages).
Noth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Phoenix Solutions, Inc. v.West Interactive Corp., Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ks1-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer.sub.--friendly.sub.-- article.aspx-?id=38915, 2 pages.
Stent, A., et al., "The CommandTalk Spoken Dialogue System," 1999, http://ac1.1dc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-- use-sid-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU.sub.--20, 1 page.
YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/.about.dod/papers/zue97.pdf, 10 pages.
Zue, V. W., "Toward Systems that Understand Spoken Language," Feb. 1994, ARPA Strategic Computing Institute, .COPYRGT.1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).

SEARCH ASSISTANT FOR DIGITAL MEDIA ASSETS

CROSS-REFERENCES TO RELATED APPLICATIONS

The present application is a continuation of U.S. application Ser. No. 11/925,599, entitled "SEARCH ASSISTANT FOR DIGITAL MEDIA ASSETS" filed Oct. 26, 2007, the entire contents of which are herein incorporated by reference for all purposes.

BACKGROUND OF THE INVENTION

1. Field of the Invention

The present invention relates to electronic searching and, more particularly, to improved approaches to searching of digital media assets.

2. Description of the Related Art

Today, online media stores, such as iTunes™ Music Store, provided by Apple Inc. provides users with access to information pertaining to many digital media assets (i.e., media items such as songs, videos, etc.). This information is available to computing devices that have Internet access. The information allows users to search, browse, review and purchase digital media assets. In searching for digital media assets, a user can enter a search string, such as a name of an artist or title of a song or album, and the resulting matching digital media assets or a representation thereof can be presented to the user. However, it can be cumbersome for users to enter the correct string due to uncertainty of names, titles or spellings. Users may also only enter and search a part of the names/titles which can lead to search results that are often not sufficient to locate the digital media assets that are desired by the user.

SUMMARY OF THE INVENTION

The invention pertains to techniques and systems for facilitating searching of digital media assets. In one embodiment, a user can be assisted in entering search strings for searching a media repository (e.g., online media store) having a plurality of digital media assets that are available, e.g., available for purchase. As media assets are purchased from the media repository, popularity indications for such digital media assets can be adjusted. When the user enters a search character, a list of possible complete search strings corresponding to digital media assets available in the media repository can be obtained over a network and presented to the user.

The invention can be implemented in numerous ways, including as a method, system, device, or apparatus (including computer readable medium or graphical user interface). Several embodiments of the invention are discussed below.

As a method for processing a search string to be used in searching for digital media information, where the digital media information pertains to digital media assets, one embodiment of the invention can include at least the acts of: receiving, over a network, at least one search character entered at a client device; determining a set of words associated with the digital media assets that match the at least one search character; filtering the set of words to remove those that are unavailable to the client device; and ordering the filtered set of words to prioritize the words based on sales popularity data.

As a method for searching for digital media information available from an online media store, one embodiment of the invention can include at least the acts of: receiving a search hints request from a client application operating on a client device, the search hints request including at least a character string including at least one character; determining a set of search hints based on the character string; obtaining a media popularity indication for each of a plurality of the search hints in the set of search hints; and sending at least a portion of the search hints to the client application on the client device.

As a method for searching for digital media assets available from an online media store, one embodiment of the invention can include at least the acts of: receiving at least one search character entered at a client device; sending a search hints request including a search string to a server device, the search string including the at least one search character; receiving a response to the search hints request including an ordered set of available words associated with the digital media assets that match the search string, the ordered set of available words being ordered in accordance with sales popularity data from the online media store for the associated digital media assets; displaying the ordered set of available words at the client device; receiving a user selection of one of the available words in the ordered set of available words; sending a search request including the selected one of the available words; receiving a response to the search request; and displaying, at the client device, information on one or more digital media assets based on the search response.

As a computer readable medium including at least executable computer program code tangibly stored thereon for searching for digital media information available from an online media store, one embodiment of the invention includes at least: computer program code for receiving a search hints request, the search hints request including at least a character string including at least one character; computer program code for determining a set of search hints based on the character string; computer program code for obtaining a media popularity indication for each of a plurality of the search hints in the set of search hints; computer program code for selecting a subset of the search hints having the highest media popularity indications; and computer program code for sending the subset of the search hints.

As a computer system, one embodiment of the invention includes at least a store server configured to host an online media store for a plurality of digital media assets. The store server can support online searching and purchasing of the digital media assets available from the online media store by one or more client devices over a network. The store server can also be configured to provide search hints to at least one of the client devices in response to entry of at least one character of a search string for a search request. The search hints being provided can be ordered in accordance with the frequency at which purchases of respective digital media assets occur.

As a computer system for supporting an online media store, one embodiment of the invention includes at least: a content database for storing digital data pertaining to a plurality of digital media assets; a finance database configured to store data concerning at least purchases of digital media assets via the online media store; a popularity module configured to access the finance database to acquire popularity data for the digital media assets based on purchases of the digital media assets; a search terms module configured to access the content database to acquire potential search terms for the digital media assets; a search hints data structure configured to store data based on the potential search terms and the popularity data, wherein the popularity data is correlated to the potential search terms; a search hints module configured to receive a search string including one or more characters, access the search hints data structure to identify a plurality of matching search hints based on the search string, ordering the matching search hints, and form a search hints list from a least a subset of the ordered matching search hints; and a search module configured to receive a search request having a completed search string and to provide a search response.

Other aspects and advantages of the invention will become apparent from the following detailed description taken in conjunction with the accompanying drawings which illustrate, by way of example, principles of the invention.

BRIEF DESCRIPTION OF THE DRAWINGS

The invention will be readily understood by the Mowing detailed description in conjunction with the accompanying drawings, wherein like reference numerals designate like structural elements, and in which.

DETAILED DESCRIPTION OF THE INVENTION

The invention pertains to techniques and systems for facilitating searching of digital media assets. In one embodiment, a user can be assisted in entering search strings for searching a media repository (e.g., online media store) having a plurality of digital media assets that are available, e.g., available for purchase. As media assets are purchased from the media repository, popularity indications for such digital media assets can be adjusted. When the user enters a search character, a list of possible complete search strings corresponding to digital media assets available in the media repository can be Obtained over a network and presented to the user.

Embodiments of the invention are discussed below with reference to FIGS. 1-7E. However, those skilled in the art will readily appreciate that the detailed description given herein with respect to these figures is for explanatory purposes as the invention extends beyond these limited embodiments.

Figure 1:
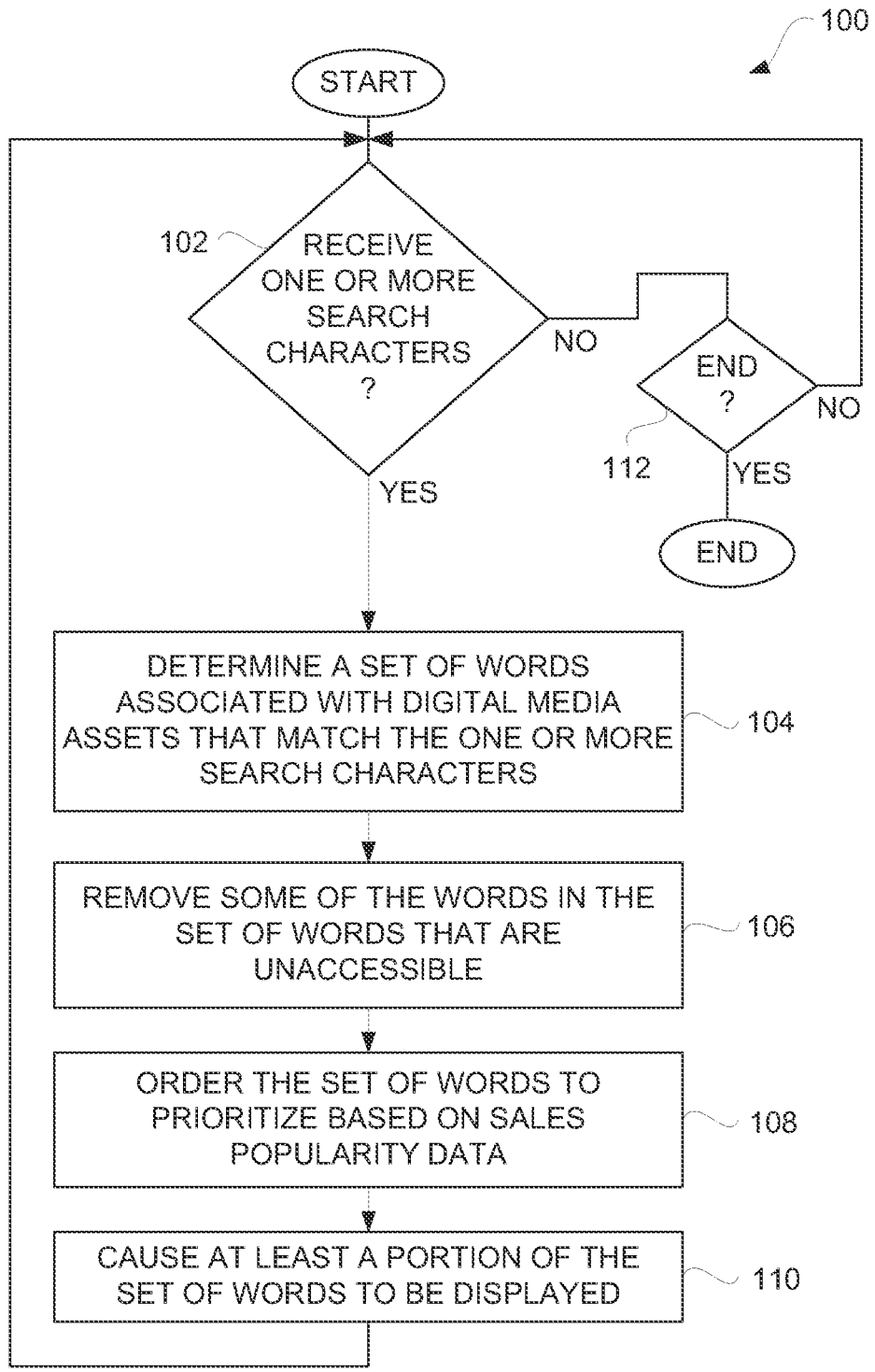
FIG. 1 is a flow diagram of a search assistance process according to one embodiment of the invention.

FIG. 1 is a flow diagram of a search assistance process 100 according to one embodiment of the invention. The search assistance process 100 can be performed by a computing device, such as a server providing a search service to client devices via a network.

The search assistance process 100 can begin with a decision 102 that determines whether one or more search characters have been received. For example, a graphical user interface can be presented on a display associated with a client device, and the graphical user interface can include a text entry box in which the one or more search characters can be input by a user of the client device.

When the decision 102 determines that one or more search characters have been received, a set of words associated with digital media assets that match the one or more search characters can be determined 104. The search characters are, in one embodiment, utilized to search for information regarding digital media assets made available by an online media store. As one example, each of the digital media assets can be identified by a name/title composed of one or more words, and the prefixes of such words can be compared with the one or more search characters when determining whether there is a match. Hence, the determination 104 of the set of words can determine those of the names/titles of digital media assets available by the online media store that match the one or more search characters that have been received.

Next, some of the words in the set of words can be removed 106 because they pertain to digital media assets that are not accessible to the requesting client device. The removal 106 of some of the words in the set of words can be considered a filtering operation that renders the resulting set of words more relevant and useful to the requesting device (and its user). As one example, certain digital media assets can be available only in certain geographic areas. Hence, if the client device requesting the search assistance is resident in a geographic area for which a particular digital media asset is deemed not available, the one or more words in the set of words pertaining to the particular digital media asset can be removed 106. In a particular example, if the client device is located in Germany, then those of the digital media assets that are not available in Germany can be removed from the set of words. As another example, certain digital media assets can only be usable on certain types of client device. Thus, if a particular digital media asset has a media type that is not usable on the requesting client device (e.g., due to hardware, software or service reasons), the one or more words in the set of words pertaining to the particular digital media asset can be removed 106.

The set of words can also be ordered 108 based on sales popularity data to prioritize the words within the set of words. The sales popularity data provides an indication of the popularity for particular digital media assets based on the frequency at which such assets are sold (i.e., purchased). For example, in one embodiment, the online media store can monitor and track sales of the digital media assets it has available to provide sales popularity data.

After the set of words have been ordered 108, at least a portion of the words in the set of words can be caused 110 to be display. For example, at least a portion of the words in the set of words can be displayed on the display associated with the client device. As a particular example, a graphical user interface can display the portion of the words in the set of words as a list proximate to a text entry box in which the one or more search characters can be input by a user of the client device. Following the block 110, the search assistance process 100 can return to repeat the decision 102 and subsequent blocks on that other search characters that are received can be similarly processed.

On the other hand, when the decision 102 determines that one or more search characters have not been received, a decision 112 can determine whether the search assistance process 100 should end. When the decision 112 determines that the search assistance process 100 should not end, then the search assistance process 100 returns to repeat the decision 102 and subsequent blocks so that the processing of blocks 104-110 can be performed as each search character is received. Alternatively, when the decision 112 determines that the search assistance process 100 should end, the search assistance process 100 can end.

Figure 2:
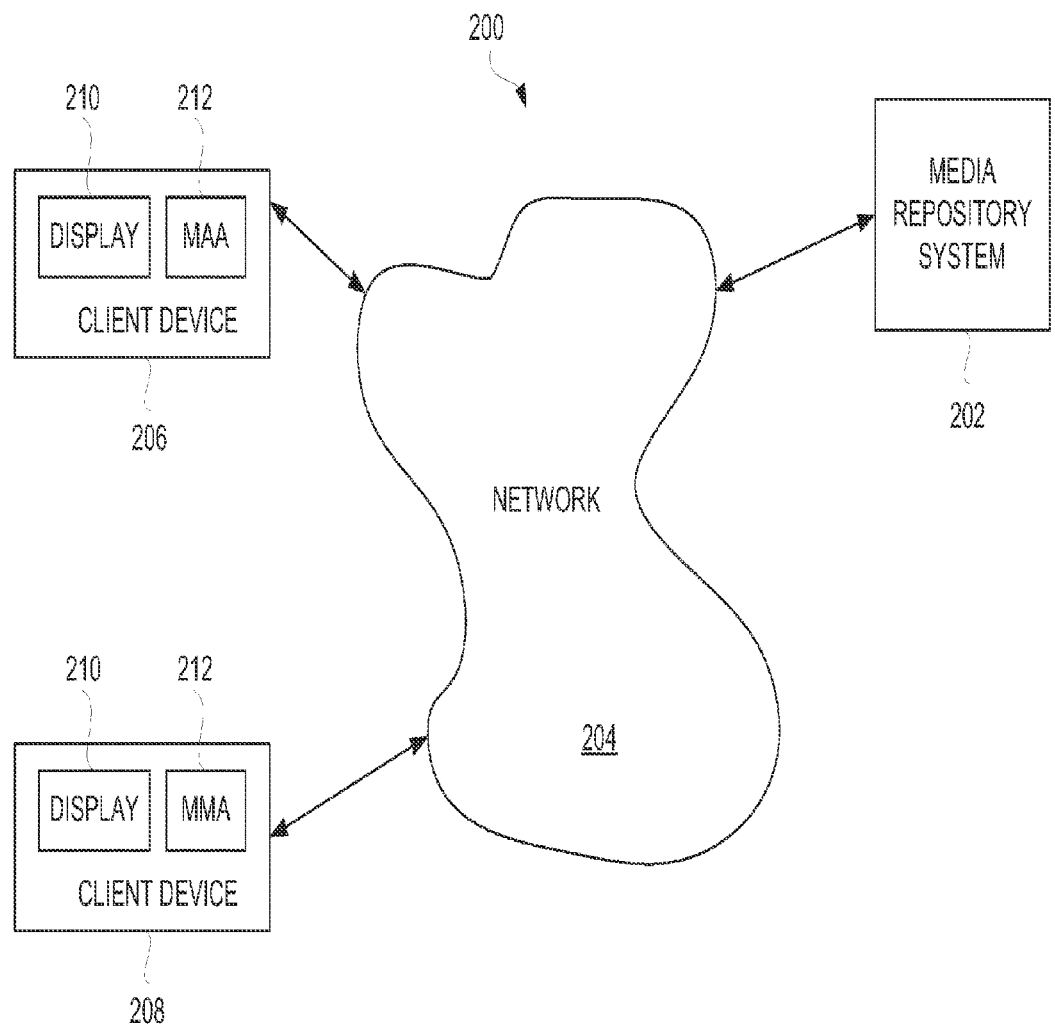
FIG. 2 is a block diagram of a media access system according to one embodiment of the invention.

FIG. 2 is a block diagram of a media access system 200 according to one embodiment of the invention. The media access system 200 includes a media repository system 202. The media repository system 202 stores and facilitates access to a plurality of digital media assets. In one implementation, the media repository system 202 provides an online media store that enables a plurality of users to search, browse, preview and purchase digital media assets. The media access system 200 also includes a network 204, such as a data network that can include one or more wired or wireless networks. As an example, the network 204 can be a global public network, such as the Internet. The media repository system 202 can couple to one or more client devices via the network 204. As illustrated in FIG. 2, the media access system 200 illustrates a first client device 206 and a second client device 208. Although the client devices 206 and 208 are illustrated in FIG. 2, it should be understood that the media access system 200 supports a large number of client devices located in geographically different areas. The different geographic areas can be city, county, statewide, national or international. The client device 206 can include a display 210 and a media access application (MMA) 212. Likewise, the client device 206 can include the display 210 and the MMA 212. The MMA 212. is one implementation of a client application that can operate on a client device to manage media thereon. One example of a media management application is iTunes® application program from Apple Inc. of Cupertino, Calif. Another example of a media management application is a network browser application (e.g., Safari® browser application from Apple Inc.).

Through use of the MMA 212, a user of the client device 206 or the client device 208 can search the plurality of digital media assets available from the media repository system 202 by way of the network 204. Among other capabilities, the media repository system 202 can present information regarding one or more digital media assets in response to a search request by the MMA 212. Typically, the information being presented in response to the search request can be displayed on the display 210 of the client device 206 or the client device 208.

Figure 3:
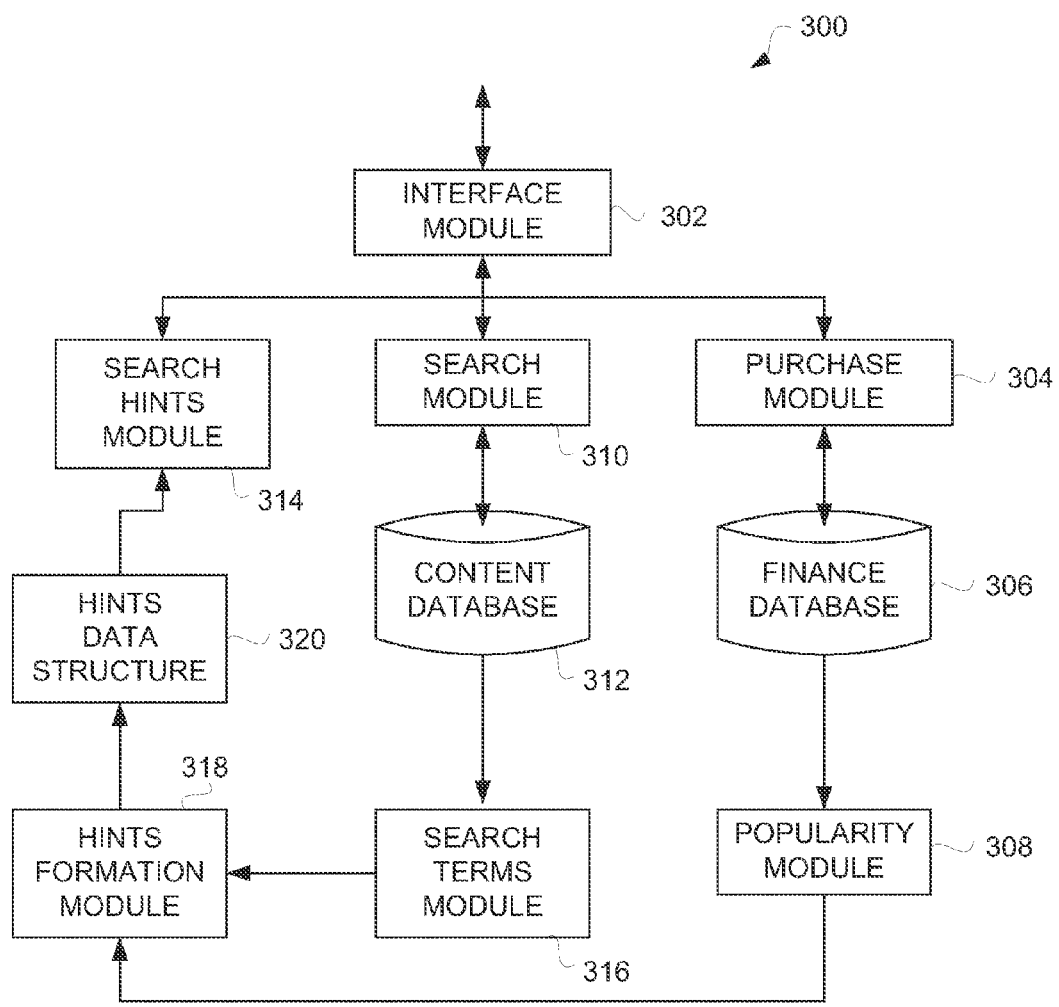
FIG. 3 is a media search and purchase system according to one embodiment of the invention.

FIG. 3 is a media search and purchase system 300 according to one embodiment of the invention. The media search and purchase process 300 can represent one embodiment of the media repository system 202 illustrated in FIG. 1.

The media search and purchase system 300 includes an interface module 302 that coordinates usage of different operational modules. The interface module 302 can couple to a network 204 illustrated in FIG. 2. One operational module is a purchase module 304. The purchase module 304 can interact with data stored in a finance database 306. For example, when a digital media asset is purchased, the purchase module 304 can process the purchase and cause various information (e.g., transaction data) to be stored in the finance database 306. The information stored to the finance database 306 can, for example, at least indicate what digital media asset was purchased and for what price. A popularity module 308 can examine the transaction data stored in the finance database 306 to determine popularity data for the various digital media assets. Since the popularity data is determined based on purchase transaction data, the popularity data can be referred to as sales popularity data (or purchase popularity data). In one embodiment, the popularity module 308 can periodically (e.g., daily, hourly, etc.) operate to determine (e.g., update) the popularity data for the various digital media assets.

The media search and purchase system 300 also includes a search module 310. In the event that a search request is received at the interface module 302, the search request is provided to the search module 310 for processing. The search module 310 can interact with a content database 312 (or some other data structure derived therefrom) to identify one or more digital media assets available from the media search and purchase system 300 that match the search string. The content database 312 can store descriptive information (e.g., metadata) as well as media content for the digital media assets. The media content is, for example, provided as electronic files that can be played or otherwise used at client devices.

The interface module 302 can receive a request for search hints. Search hints are hints that facilitate a user in entering a search string. An entered search string can be utilized to search through a plurality of digital media assets to identify those that "match." The interface module 302 can forward the request for search hints to a search hints module 314. The search hints module 314 can process the search hints request and return one or more search hints to the user by a way of the interface module 302. The search hints are used by the user to more easily produce a search string to be utilized in searching for digital media assets by way of the search module 310.

The search hints module 314 can utilize data from the finance database 306 and the content database 312 to provide meaningful hints to the user. In one embodiment, these search hints being provided to the user are ranked, ordered or presented based upon their popularity with respect to purchases of the corresponding digital media assets. More particularly, a search terms module 316 can extract relevant search terms from the content database 312 which stores the various digital media assets. Then, a hints formation module 318 can utilize popularity sales data provided by the popularity module 308 together with the search terms provided by the search terms module 316 to produce the search hints which are stored to a hints data structure 320 for easy access by the search hints module 314. In one embodiment, the search terms module 316 and/or the hints formation module 318 can operate periodically (e.g., daily, hourly, etc.) to produce the search hints that are stored to the hints data structure 320.

In one embodiment, the hints data structure 320 is modeled akin to a trie data structure. A trie data structure, also known as a prefix tree, is an ordered tree data structure in which descendants of any one node have a common prefix of the string associated with that node. The trie data structure 320 can efficiently store a large number of terms, wherein common prefixes can be shared. The trie data structure can allow rapid lookup of words. Still further, according to one embodiment, the trie data structure can be augmented to further store: (i) sales popularity data, (ii) availability of the corresponding digital media asset in particular geographic regions, (iii) and/or an indication of its associated media type. By storing such additional information, the search hints are able to be rapidly found, filtered and/or ordered.

Figure 4A:
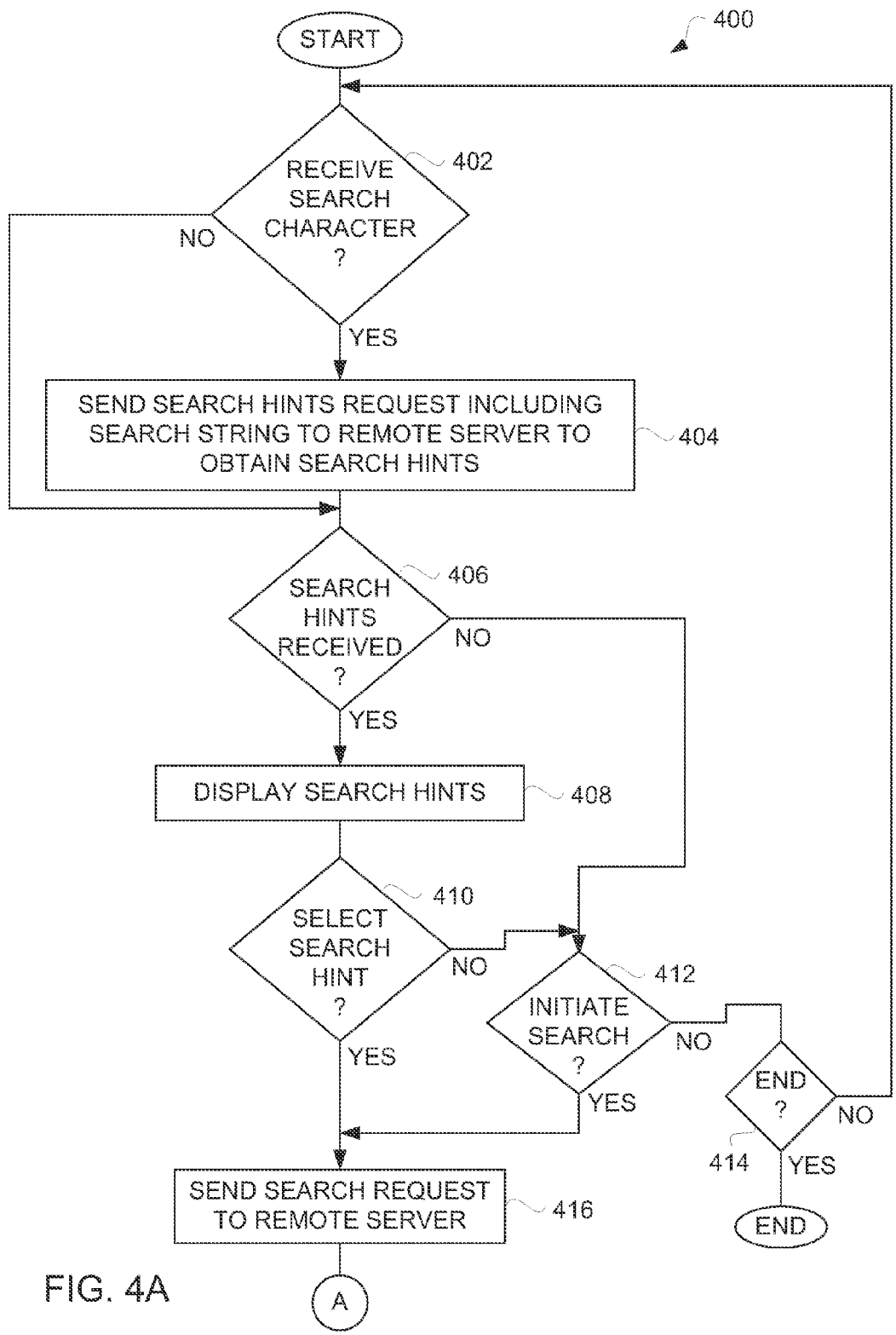
FIGS. 4A and 4B are flow diagrams of a search process according to one embodiment of the invention.
Figure 4B:
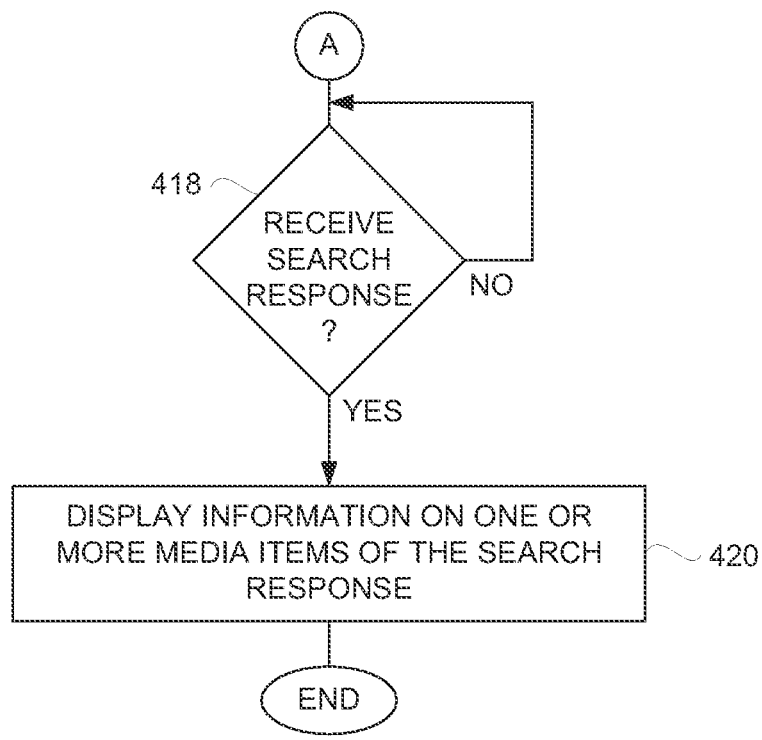

FIGS. 4A and 4B are flow diagrams of a search process 400 according to one embodiment of the invention. The search process 400 is, for example, performed by a client device, such as the client device 206, 208 illustrated in FIG. 2.

The search process 400 begins with a decision 402 that determines whether a search character has been received. Here, a user of the client device can interact with the graphical user interface to enter one or more search characters. As a particular example, the graphical user interface can provide a text box in which the user can enter one or more characters to be used as a search string.

When the decision 402 determines that a search character has been received, a search hints request including the search string can be sent 404 to a remote server to obtain search hints. The remote server, for example, can pertain to the media repository system 202 illustrated in FIG. 2. or the search hints module 314 illustrated in FIG. 3. Alternatively, when the decision 402 determines that a search character has not been received, the block 404 can be bypassed.

Following the block 404 or its being bypassed, a decision 406 determines whether search hints have been received. When the decision 406 determines that search hints have not been received, the search process 400 can proceed to a decision 412 discussed below.

On the other hand, when the decision 406 determines that search hints have been received, the search hints can be displayed 408. In one implementation, the search hints are displayed 408 as part of the graphical user interface on the client device. As a particular example, the graphical user interface can provide not only the text box in which the user can enter one or more characters to be used as a search string but also a list of the search hints. Typically, the list of search hints would be displayed proximate to the text box that receives the search string.

Next, a decision 410 determines whether a particular one of the search hints has been selected. When the decision 410 determines that a search hint has not been selected, a decision 412 determines whether a search is to be initiated. For example, a search can be initiated in response to a user interaction with the graphical user interface to request a search. For example, the user of the client device can select a virtual button (e.g., search button) to initiate a search. When the decision 412 determines that a search has not been initiated, a decision 414 can determine whether the search process should end. When the decision 414 determines that the search process should not end, then the search process 400 can return to repeat the decision 402. In one implementation, when the search process 400 returns to the decision 402, the decision 402 can determine whether an additional character has been added to the search string and, if so, a new search hints request can be sent 404 and the previous search hints request (which has not yet been fulfilled) can be canceled. Alternatively, when the decision 414 determines that the search process 400 should end, the search process 400 can end.

On the other hand, when the decision 410 determines that a search hint has been selected or when the decision 412 determines that a search is to be initiated, a search request can be sent to the remote server. The search string associated with the search request is either a selected one of the search hints or a search string entered by the user. Next, a decision 418 determines whether a search response has been received. Here, the search process 400 awaits the response from the remote server to the search request. When the decision 418 determines that a search response has not been received, the search process 400 can await such and response. Alternatively, once the decision 418 determines that a search response has been received, information on one or more media items of the search response can be displayed 420. Following the block 420, the search process 400 can end.

Figure 5:
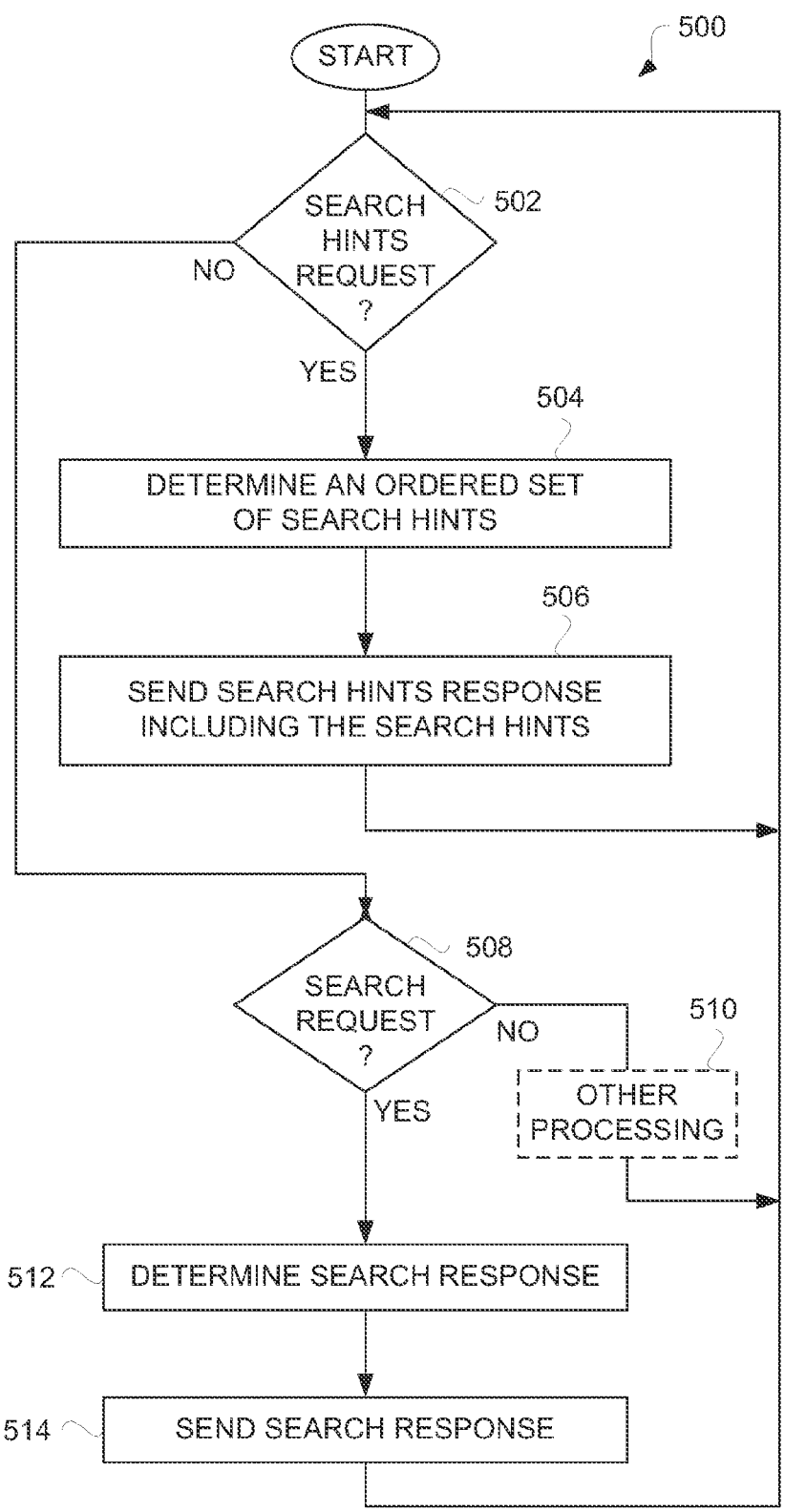
FIG. 5 is a flow diagram of a search process according to one embodiment of the invention.

FIG. 5 is a flow diagram of a search process 500 according to one embodiment of the invention. The search process 500 is, for example, performed by a server. As an example, the server can pertain to the media repository system 202 illustrated in FIG. 2 or in the search module 310 illustrated in FIG. 3.

The search process 500 can begin with a decision 502 that determines whether a search hints request has been received. When the decision 502 determines that a search hints request has been received, an ordered set of search hints can be determined 504. Here, as an example, the search hints module 314 can access the hints data structure 320 to acquire a set of search hints which if not ordered can thereafter be ordered. A search hints response including the search hints can then be sent 506. The search hints response can be sent to a requestor that requests the search hints. The requestor can refer to a client device, a user of the client device, or a client application. Following the block 506, the search process 500 can return to repeat the decision 502 so that additional requests can be processed.

When the decision 502 determines that a search hints request has not been received, a decision 508 can determine whether a search request has been received. When the decision 508 determines that a search request has not been received, then optionally other processing 510 can be performed. The other processing can be various other processing tasks associated with a server supporting a media repository system or, more particularly, an online media store. Alternatively, when the decision 508 determines that a search request has been received, a search response to the search request can be determined 512. Here, the search response operates, in one embodiment, to identify one or more digital media assets available from the media repository system that include, or are described by, the search string associated with the search request. The resulting search response can then be sent 514. The search response can be sent 514 to a requestor that requests the search. The requestor can refer to a client device, a user of the client device, or a client application. Following the blocks 510 and 514, the search process 500 can return to repeat the decision 502 so that additional requests can be processed.

Figure 6:
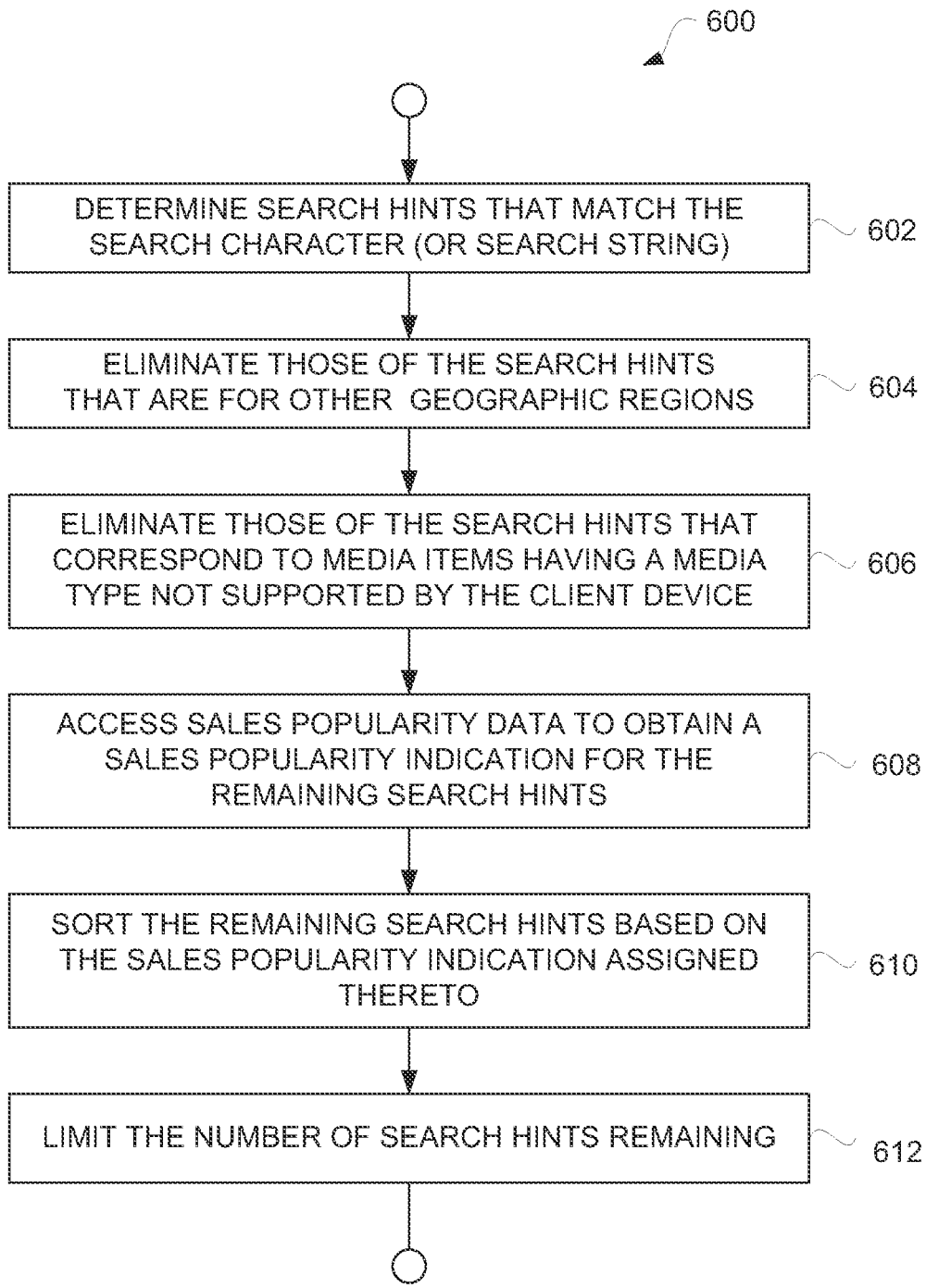
FIG. 6 is a flow diagram of a search hints determination process according to one embodiment of the invention.

FIG. 6 is a flow diagram of a search hints determination process 600 according to one embodiment of the invention. The search hints determination process 600 is, for example, processing that can be performed by the block 504 of the search process 500 illustrated in FIG. 5.

The search hints determination process 600 determines 602 search hints that match the search character (or search string). The digital media items that are available can be described by descriptive information. The determination 602 can search the descriptive information to determine which of the digital media items match the search character (or search string). For rapid search processing, as an example, the determination 602 can be performed using the search hints module 314 that can access the hints data structure 320 to acquire a set of search hints based on the search character (or search string).

The search hints can then be further processed so that those that are eventually presented to requestors are more relevant. In particular, those search hints that are for other geographic areas can be eliminated 604 from the determined search hints. Also, those of the search hints that correspond to media items having a media type not supported by the client device can be eliminated 606. For example, different client devices that can utilize the media repository system can have different capabilities. For example, the different capabilities can be due to hardware, software and/or service differences. As a result, some media types may not be supported on a particular client device. Hence, those search hints that are associated with media items that have media types not supported by the particular requesting client device can be eliminated (i.e., removed, filtered-out, etc.) from the search hints. Still further, sales popularity data can be accessed to obtain a sales popularity indication for each of the remaining search hints. The remaining search hints can then be sorted 610 (more generally, ordered) based on the sales popularity indication assigned to the particular search hints. Still further, the number of search hints remaining can be limited 612. By limiting the number of search hints that are remaining, the search hints determination process 600 can ensure that the maximum number of search hints that are returned to requestor does not exceed the particular limit. Given that the media repository system can store a large number of media items, the various search terms and search hints can also be numerous. Consequently, limiting the number of search hints being returned to the requestor can serve to present to requestor only the most relevant search hints in a manner that can be conveniently presented on the graphical user interface associated with the client device.

Figure 7A:
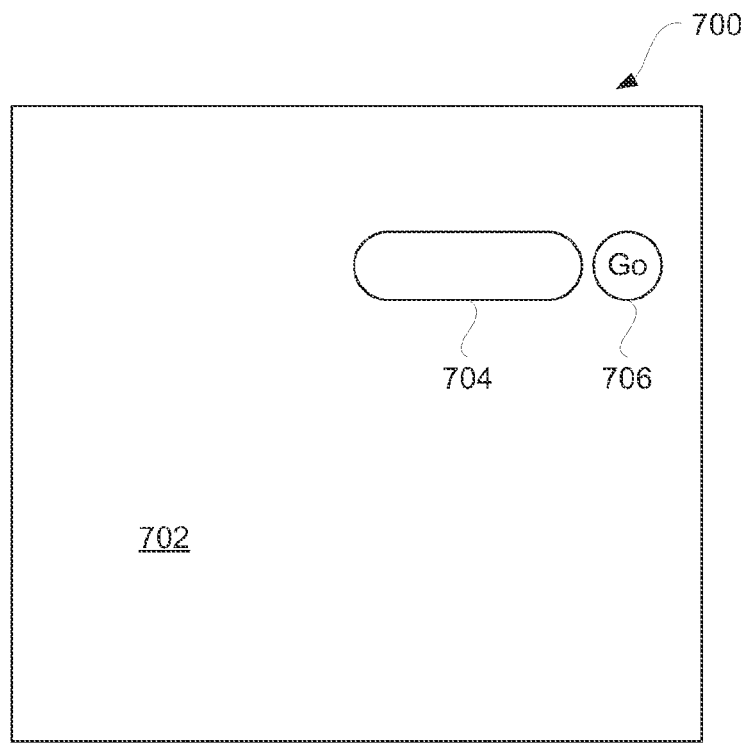
FIGS. 7A-7C are diagrams of an exemplary graphical user interface according to one embodiment of the invention.
Figure 7B:
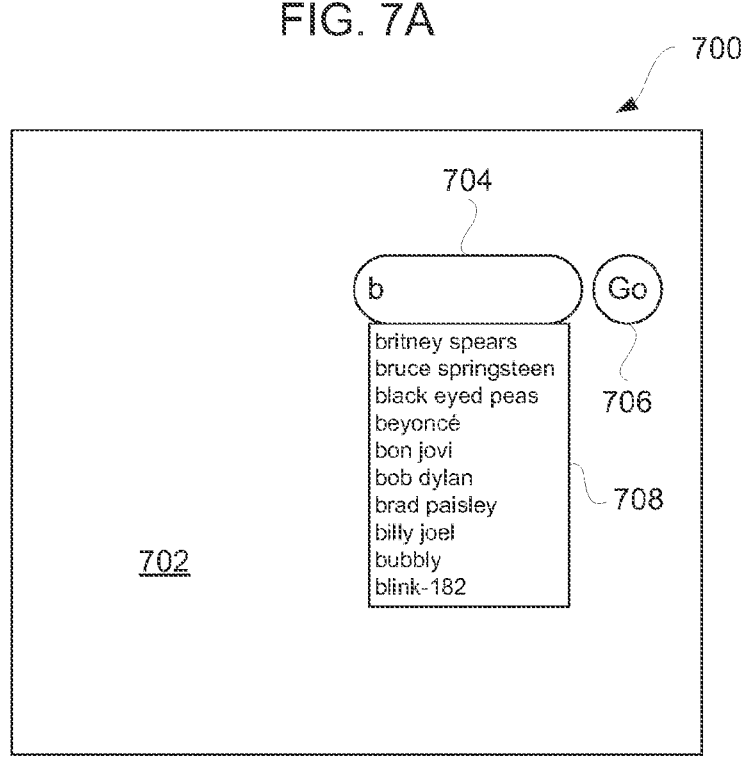
Figure 7C:
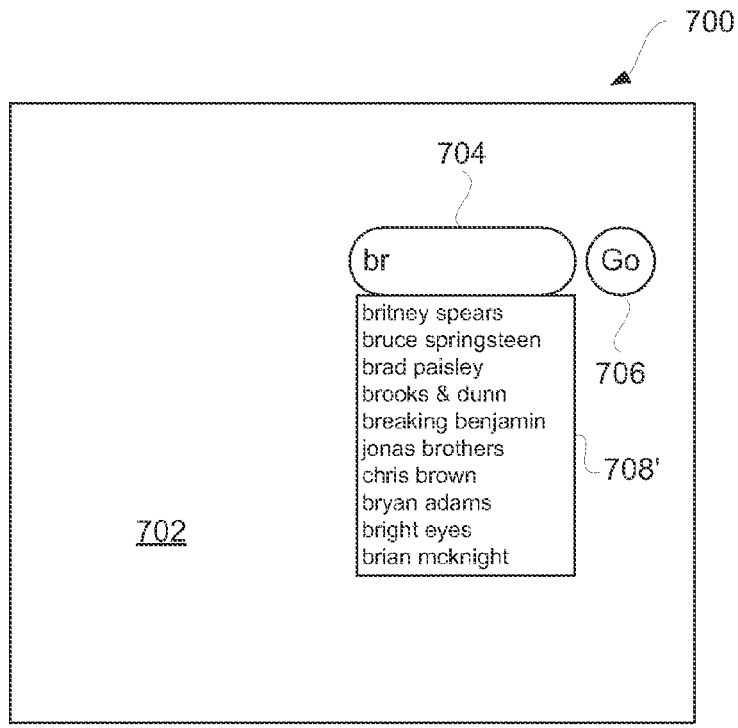

Search hints can be presented by a graphical user interface on a display device of a client device. FIGS. 7A-7C are diagrams of an exemplary graphical user interface according to one embodiment of the invention. FIG. 7A is a diagram of a page 700 (e.g., XML or HTML page) presented by a client application (e.g., MMA or network browser) on a display. A body 702 of the page 700 can include various contents, controls or links (not shown) as desired. For example, the body 702 can presents information provided by an online media store. In addition, according to one embodiment, the page 700 can include a search box 704 and a search control 706. A user can enter one or more search characters into the search box 704. When the user desires to submit the search request (e.g., to a remote server) for processing and return of search results, the user can select the search control 706. As the user enters a search character into the search box 704, a search hints box 708 can be displayed. As illustrated in FIG. 7B, when the user has entered the character "b" into the search box 704, the search hints box 708 can be automatically displayed and populated with a plurality of search hints. The particular search hints to be included in the search hints box 708 can be determined as discussed above. In this embodiment, the search hints listed in the search hints box 708 are names of artists or groups. However, as noted all the entries in the search hints box have a word that begins with the character "b". Further, as illustrated in FIG. 7C, the user can then enter the character "r" into the search box 704. The search string is now "br". Here, the search hints within the search hints box 708' can be automatically updated to list those search hints that match the search string "br". Now all the entries in the search hints box 708' have a word that begins with the character "br".

Figure 7D:
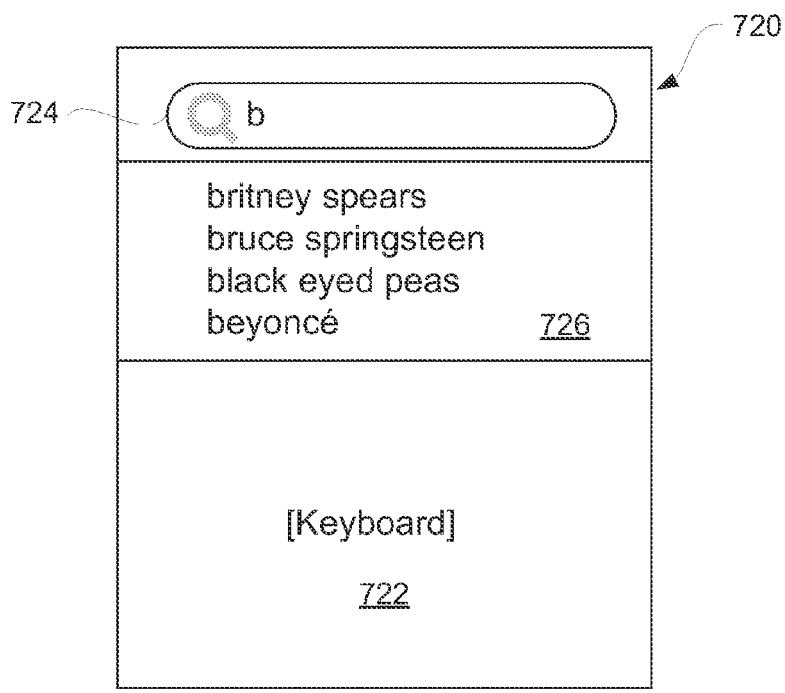
FIGS. 7D-7E are diagrams of an exemplary graphical user interface according to one embodiment of the invention.
Figure 7E:
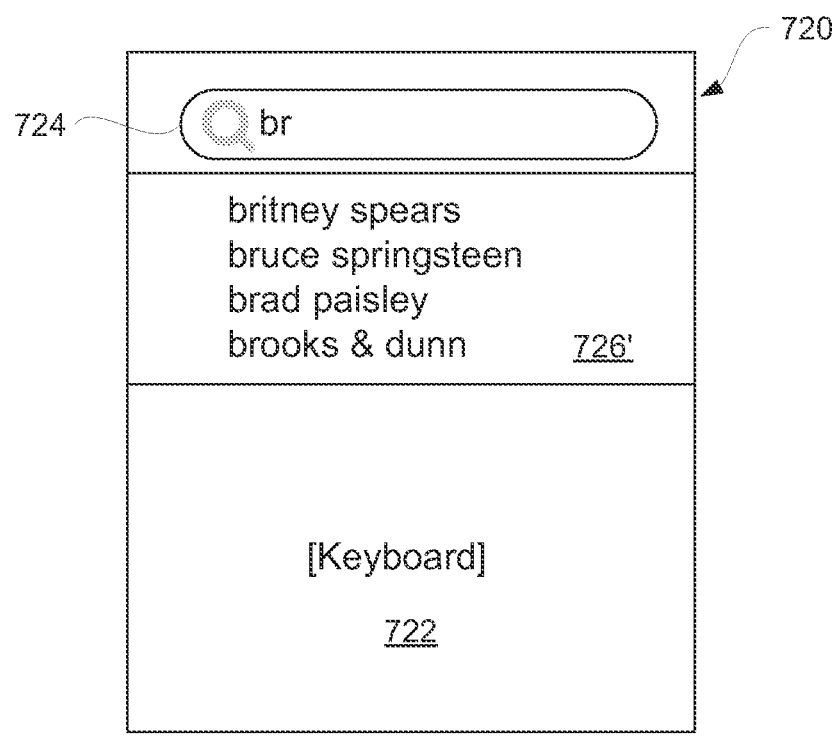

FIGS. 7D and 7E are diagrams of an exemplary graphical user interface according to another embodiment of the invention. FIG. 7D is a diagram of a user interface screen 720 presented on a display. The user interface screen 720 includes a keyboard region 722 where a virtual keyboard can be displayed. The user interface screen 720 can also includes a search box 724. A user can enter one or more search characters into the search box 724. As the user enters a search character into the search box 724, a search hints area 726 can be displayed. As illustrated in FIG. 7D, when the user has entered the character "b" into the search box 724, the search hints area 726 can be automatically displayed and populated with a plurality of search hints. The particular search hints to be included in the search hints box 726 can be determined as discussed above. In this embodiment, the search hints listed in the search hints box 726 are names of artists or groups. However, as noted all the entries in the search hints box have a word that begins with the character "b". Further, as illustrated in FIG. 7D, the user can then enter the character "r" into the search box 724. The search string is now "bra". Here, the search hints within the search hints box 726' can be automatically updated to list those search hints that match the search string "bra". Now all the entries in the search hints box 726' have a word that begins with the character "bra". When the user desires to submit the search request (e.g., to a remote server) for processing and return of search results, the user can select one of the search hints listed within the search hints box 726 or 726'. The user interface screen 720 can be touch sensitive so that the user can, in one embodiment, interact with the screen 720 to enter characters via the virtual keyboard or to select one of the listed search hints. Note also that the number of the search hints being displayed can be controlled and varied for different user interfaces or devices. In FIGS. 70 and 7E, up to four search hints can be displayed, whereas in FIGS. 78 and 7C up to ten search hints can be displayed.

The client device utilized herein can, for example, correspond to an electronic device, such as a computing device (e.g., desktop or portable personal computer), mobile phone (e.g., cellular phone), personal digital assistant (PDA), media player (e.g., music, videos, games, images), media storage device, camera, remote control, and/or the like. The electronic device can also be a multi-functional device that combine two or more of these device functionalities into a single device. The electronic device utilized herein can be a hand-held electronic device. The term hand-held generally means that the electronic device has a form factor that is small enough to be comfortably held in one hand. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Although the above discussion can make use of sales popularity data, in other embodiments, media popularity data can, more generally, be used in place of sales popularity data. Media popularity data provides an indication of the popularity for particular digital media assets. The popularity can be based on sales, previews, downloads, ratings or rankings of media assets. For example, in one embodiment, an online media store can monitor and track the popularity of the digital media assets it has available to provide media popularity data. Additionally, it should be noted that media popularity data, as well as sales popularity data, can be limited to a particular time period (e.g., year(s), month(s), day(s)).

The digital media assets (e.g., digital media items) can pertain to video items (e.g., video files or movies), audio items (e.g., audio files or audio tracks, such as for songs (music), podcasts or audiobooks), or image items (e.g., photos).

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that search hints can be provided to a client application from a remote server. The search hints can serve to assist a user of the client application with entering of a search string for a search operation with respect to a media repository, such as an online media store. Another advantage of the invention is that near real time responsiveness enables presentation of search hints at a client application soon after a character for the search string is entered. Still another advantage of the invention is that the search hints can be provided in an ordered fashion based on popularity of corresponding digital media assets with respect to sales from a media repository, such as an online media store.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as failing within the scope of the invention.

What is claimed is:

1. A method for processing a search string to be used in searching for digital media information, the digital media information pertaining to digital media assets, said method comprising:
   receiving, over a network at an online media store, at least one search character entered at a client device;
   determining a set of words that match the at least one search character, each word in the determined set of words being associated with one or more digital media assets available at the online media store and each digital media asset having an associated media type;
   for each respective word in the determined set of words:
      determining whether the client device supports the media type of at least one of the one or more digital media assets associated with the respective word in the determined set of words;
      in accordance with a determination that the client device does not support the media type associated with any of the one or more digital media assets associated with the respective word, removing the respective word from the determined set of words to produce a filtered set of words.

2. The method of claim 1, wherein the determination that the client device does not support the media type is due to software.

3. The method of claim 1, wherein the determination that the client device does not support the media type is due to hardware.

4. The method of claim 1, further comprising:
   removing words from the set of words that are unavailable to the client device due to the geographic location of the client device.

5. The method of claim 1, wherein the digital media information pertains to digital media assets available from an online media repository, and wherein the online media repository is an online media store.

6. A method for searching for digital media information available from an online media store, said method comprising:
   receiving a search hints request from a client application operating on a client device, the search hints request including at least a character string including at least one character;
   determining a set of search hints based on the character string, wherein said determining of the set of search hints obtains the matching search hints from a hints data structure and wherein the set of search hints correspond to digital media assets available in an online media repository;
   obtaining a location of the client device;
   eliminating from the set of search hints those of the search hints in the set of search hints that are associated with a location other than the location of the client device; and
   sending a portion of the search hints in the set of search hints to the client application on the client device, the portion of the search hints sent to the client application being less than all the search hints in the set of search hints.

7. The method of claim 6, wherein the location is a country.

8. The method of claim 6, wherein the location is statewide.

9. The method of claim 6, wherein the location is a particular geographic area.

10. The method of claim 6, wherein said method further comprises:
    limiting the number of search hints remaining in the set of search hints.

11. The method of claim 6, wherein the client device supports one or more media types, and
    wherein said determining of the set of search hints comprises:
       determining a set of search hints that match the character string;
       for each respective search hint in the determined set of search hints:
          determining whether the client device supports a media type of at least one of the one or more digital media assets associated with the respective search hint in the determined set of search hints;
          in accordance with a determination that the client device does not support the media type associated with any of the one or more digital media assets associated with the respective search hint, removing the respective search hint from the determined set of search hints.

12. A non-transitory computer readable storage medium storing one or more programs configured for execution by a server system, the one or more programs comprising instructions for:
    receiving a search hints request, the search hints request including at least a character string including at least one character;
    determining a set of search hints based on the character string, each search hint in the set of search hints being associated with one or more digital media assets available from the online media store and each digital media asset having an associated media type;
    for each respective search hint in the determined set of search hints:
       determining whether the client device supports the media type of at least one of the one or more digital media assets associated with the respective search hint in the determined set of search hints; and
       in accordance with a determination that the client device does not support the media type associated with any of the one or more digital media assets associated with the respective search hint, removing the respective search hint from the determined set of search hints.

13. The non-transitory computer readable storage medium of claim 12, wherein the determination that the client device does not support the media type is due to software.

14. The non-transitory computer readable storage medium of claim 12, wherein the search hints request is issued by a client device, wherein the client device supports one or more media types, and
    wherein the instructions for determining of the set of search hints further comprise instructions for:
       obtaining a country in which the client device is located; and eliminating from the set of search hints those of the search hints in the set of search hints that are associated with a country other than the country associated with the client device.

15. The non-transitory computer readable storage medium of claim 14, wherein the one or more programs further comprise instructions for:
limiting the number of search hints remaining in the set of search hints.

16. A non-transitory computer readable storage medium storing one or more programs configured for execution by a server system, the one or more programs comprising instructions for:
receiving a search hints request from a client application operating on a client device, the search hints request including at least a character string including at least one character;
determining a set of search hints based on the character string, wherein said determining of the set of search hints obtains the matching search hints from a hints data structure and wherein the set of search hints correspond to digital media assets available in an online media repository;
obtaining a location of the client device;
eliminating from the set of search hints those of the search hints in the set of search hints that are associated with a location other than the location of the client device; and
sending a portion of the search hints in the set of search hints to the client application on the client device, the portion of the search hints sent to the client application being less than all the search hints in the set of search hints.

17. The non-transitory computer readable storage medium of claim 16, wherein the location is a country.

18. The non-transitory computer readable storage medium of claim 16, wherein the location is a particular geographic area.

19. The non-transitory computer readable storage medium of claim 16, wherein said method further comprises:
limiting the number of search hints remaining in the set of search hints.

20. The non-transitory computer readable storage medium of claim 16, wherein the client device supports one or more media types, and
wherein said determining of the set of search hints comprises:
determining a set of search hints that match the character string;
for each respective search hint in the determined set of search hints:
determining whether the client device supports a media type of at least one of the one or more digital media assets associated with the respective search hint in the determined set of search hints;
in accordance with a determination that the client device does not support the media type associated with any of the one or more digital media assets associated with the respective search hint, removing the respective search hint from the determined set of search hints.

* * * * *